Patented Sept. 29, 1936

2,055,933

UNITED STATES PATENT OFFICE 2,055,933

PRODUCTION OF COMPOUNDS OF ESTERS OF STRONG ACIDS WITH ANTHRAPYRIMIDINES

Karl Koeberle, Ludwigshafen-on-the-Rhine, Germany, assignor to General Aniline Works, Inc., New York, N. Y., a corporation of Delaware No Drawing. Application March 9, 1935, Serial No. 10,332. In Germany March 14, 1934

14 Claims. (Cl. 260—32)

The present invention relates to compounds of esters of strong acids with compounds of the anthrapyrimidine series and a process of producing same.

I have found that compounds of esters of strong acids with compounds of the anthrapyrimidine series are obtained by heating compounds of the anthrapyrimidine series with esters of strong acids substantially in the absence of water.

The reaction is preferably carried out in the presence of an inert organic diluent, as for example nitrobenzene, trichlorbenzene, dichlorbenzene, benzene or toluene. The anthrapyrimidines may also be brought directly into reaction with the said esters.

Compounds of the anthrapyrimidine series suitable for the purpose of my present invention are for example anthrapyrimidines, anthrapyrimidones, anthradipyrimidines, anthrapyrimidinopyrimidones and derivatives of these compounds, as for example their halogen, hydroxy, mercapto, nitro, amino, alkyl, such as methyl or ethyl methoxy and arylido compounds.

Esters of the said kind are for example the esters of halogen hydracids, as for example methyl chloride, methyl iodide, ethyl bromide, or of sulphuric acid, as for example dimethylsulphate or diethyl sulphate, or of phosphoric acid, or of arylsulphonic acids, as for example esters of the ortho- and paratoluenesulphonic acids.

The reaction is generally speaking carried out at elevated temperatures. The yields are usually very good and in many cases even amount to those theoretically calculated.

The compounds obtainable according to the present invention usually dissolve comparatively readily in water and solvents which behave similarly to water. They may be employed as such or as intermediate products for dyestuff chemistry, pharmaceutical chemistry and in the photographic industry.

The following examples will further illustrate how my said invention may be carried out but the invention is not restricted to these examples. The parts are by weight.

Example 1

A mixture of 100 parts of pure 4-amino-1.9-anthrapyrimidine (prepared by the sublimation of crude 4-amino-1.9-anthrapyrimidine or by the purification of the said compound by way of its sulphate), 90 parts of para-toluenesulphonic acid methyl ester and 1000 parts of trichlorbenzene is boiled for an hour. After cooling to about 100° C., the yellow-red crystals obtained in a yield of from 95 to 100 per cent of 4-amino-1.9-anthrapyrimidine with para-toluene-sulphonic acid methyl ester which probably has the following formula:

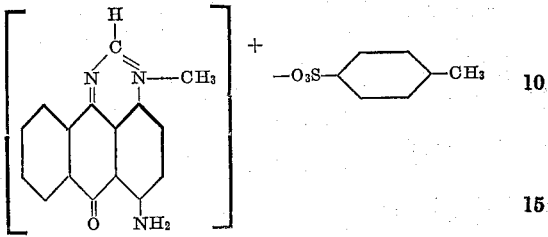

are filtered off by suction. They dissolve in concentrated sulphuric acid giving a red coloration and in thin layers giving a blue-red coloration; the coloration becomes deep-blue-red by the addition of formaldehyde. The compound is also readily soluble in water giving a yellow-red coloration. It may be crystallized from water. It dissolves only with great difficulty in organic solvents free from hydroxyl groups, as for example trichlorbenzene or nitrobenzene, but more readily in alcohols, ketones or phenols.

The aqueous solution of the compound becomes blue-red upon the addition of the caustic soda solution; the alkaline hydrosulphite solution is brown; the latter dyes vegetable fibres reddish yellow shades.

The following table gives the properties of some compounds of anthrapyrimidine and its derivatives with esters of the kind defined above.

| Initial material | Ester | Resulting compound |
| --- | --- | --- |
| 1.9 - anthrapyrimidine | Para-toluene-sulphonic acid methyl ester | Brown needles. Dissolve in sulphuric acid giving a green-yellow coloration and readily soluble in water giving a yellow color |
| 5 - amino - 1.9 - anthrapyrimidine | Para-toluene-sulphonic acid methyl ester | Violet needles. Dissolve in sulphuric acid giving a green-yellow coloration and in water giving a violet coloration |
| 8 - amino - 1.9 - anthrapyrimidine | Para-toluene-sulphonic acid methyl ester | Blue crystals. Dissolve in sulphuric acid giving a green-yellow coloration; readily soluble in water giving a blue coloration |
| 2 - amino - 1.9 - anthrapyrimidine | Para-toluene-sulphonic acid methyl ester | Orange crystals. Give a violet coloration in sulphuric acid; readily soluble in water giving an orange coloration |
| 4 - para - chlor - benzoyl - amino - 1.9 - anthrapyrimidine | Para-toluene-sulphonic acid methyl ester | Yellow crystals. Give reddish yellow coloration in sulphuric acid and green-yellow in water |

| Initial material | Ester | Resulting compound |
|---|---|---|
| 5-para-toluidine-1.9-anthrapyrimidine | Para-toluene-sulphonic acid methyl ester | Violet crystals. Give yellow coloration in sulphuric acid and blue-red in water |
| 4-amino-C-phenyl-1.9-anthrapyrimidine | Para-toluene-sulphonic acid methyl ester | Orange crystals. Give orange-red coloration in sulphuric acid (in thin layers, violet) and orange in hot water |
| 4-amino-1.9-anthrapyrimidine | Para-toluene-sulphonic acid ethyl ester | Orange crystals. Give yellow-red coloration in sulphuric acid; dissolve readily in water giving yellow-red coloration |
| 4-amino-1.9-anthrapyrimidine | Methyl iodide | Orange-red crystals. Yellow-red in sulphuric acid, orange in water |
| 4-amino-1.9-anthrapyrimidine | Para-toluene-sulphonic acid chlorethyl ester | Yellow-red crystals. Yellow-red in sulphuric acid; dissolve readily in water with yellow coloration |
| 4-amino-1.9-anthrapyrimidine | Benzyl chloride | Yellow-orange crystals. Yellow-red in sulphuric acid; readily soluble in water with yellow color |
| 4-amino-1.9-anthrapyrimidine | Methyl chloride | Yellow-brown needles. Orange-red in sulphuric acid; readily soluble in water with orange color |
| 4-amino-1.9-anthrapyrimidine | Ethyl bromide | Orange-red crystals. Orange-red in sulphuric acid; readily soluble in water with yellow-orange color |
| 4-amino-1.9-anthrapyrimidine | Dimethyl sulphate | Yellow-orange crystals. Yellow-red in sulphuric acid; very readily soluble in water with yellow-red coloration |
| 4-hydroxy-1.9-anthrapyrimidine | Para-toluene-sulphonic acid methyl ester | Yellow crystals. Yellow-red in sulphuric acid; readily soluble in water with yellow coloration |
| 4-methylamino-1.9-anthrapyrimidine | Para-toluene-sulphonic acid methyl ester | Orange crystals. Orange-red in sulphuric acid; orange in water |
| Py-C-amino-1.9-anthrapyrimidine | Para-toluene-sulphonic acid methyl ester | Yellow-orange crystals. Readily soluble in water with yellow-orange color |
| 4-amino-1.9-anthrapyrimidine | Diethyl sulphate | Yellow-orange crystals. Yellow red in sulphuric acid; very readily soluble in water with yellow-red coloration |
| 4-hydroxy-dichlor-1.9-anthrapyrimidine | Para-toluene-sulphonic acid methyl ester | Yellow crystals. Yellow-red in sulphuric acid; readily soluble in water with yellow coloration |
| Beta-methyl 5-4-amino-1.9-anthrapyrimidine | Para-toluene-sulphonic acid methyl ester | Orange crystals. Yellow-orange in sulphuric acid; readily soluble in water with orange coloration |
| Py-C-methyl-4-amino-1.9-anthrapyrimidine | Para-toluene-sulphonic acid methyl ester | Yellow-orange crystals. Readily soluble in water with violet coloration |
| 1.9.4.10-anthradipyrimidine | Para-toluene-sulphonic acid methyl ester | Yellow crystals. Readily soluble in water with yellow coloration |
| Amino-1.9-anthrapyrimidine (from anthrapyrimidine by nitration and reduction) | Para-toluene-sulphonic acid methyl ester | Blue crystals. Yellow in sulphuric acid; readily soluble in water with violet coloration |

In addition to the said compounds of the anthrapyrimidine series, many other compounds of the said series may be employed as initial materials, such as chlor- or brom-1.9 anthrapyrimidines, amino-halogen- or acetylamino-1.9-anthrapyrimidines, urea derivatives of 1.9-anthrapyrimidine, arylido- and dialkylamino-1.9-anthrapyrimidines and diazo salts of amino-1.9-anthrapyrimidines. Instead of the esters stated, other esters may be employed as for example orthotoluene-sulphonic acid esters, benzene-, toluene- or naphthalene sulphonic acid phenyl esters, octodecyl bromide, octodecyl chloride, vinyl chloride, butyl bromide or diethyl sulphate.

Instead of trichlorbenzene, dichlorbenzene, mono-chlorbenzene, nitrobenzene, pyridine, benzyl ether or diphenyl may be employed as diluents.

*Example 2*

A mixture of 50 parts of 4-hydroxy-1.9-anthrapyrimidine, 500 parts of trichlorbenzene and 75 parts of dimethyl sulphate is heated at between 155° and 160° C. for 15 minutes. After cooling the crystalline reaction product is filtered off by suction. It is obtained in a yield of 75 parts. It dyes animal and vegetable fibres very fast brown shades.

*Example 3*

A mixture of 137 parts of 2-brom-4-benzoyl-amino-1.9-anthrapyrimidine and 300 parts of methyl iodide is heated, while stirring, in an autoclave at 150° C. for 6 hours. After cooling the excess methyl iodide is removed by distillation or by filtering off the reaction product. The new compound forms yellow crystals which dissolve in water giving a yellow coloration which turns violet-red upon the addition of sodium hydroxide solution. It dyes vegetable and animal fibres greenish yellow shades.

*Example 4*

A mixture of 125 parts of 4-amino-1.9-anthrapyrimidine and 500 parts of the normal ester of phosphoric acid with chlorethyl alcohol is heated while stirring at 150° C. for a short time. As soon as a sample withdrawn has become readily soluble in water, the reaction mixture is allowed to cool. The reaction product is then filtered off by suction. It forms brown-red needles which dissolve in water giving a red coloration which upon addition of sodium hydroxide solution turns olive-yellow. The compound dyes vegetable and animal fibre orange shades.

What I claim is:—

1. Compounds of esters of strong acids with anthrapyrimidines.
2. Compounds of esters of strong acids with 1.9-anthrapyrimidines.
3. Compounds of esters of strong acids with amino-1.9-anthrapyrimidines.
4. Compounds of esters of strong acids with hydroxy-1.9-anthrapyrimidines.
5. Compounds of esters of strong acids with halogen-1.9-anthrapyrimidines.
6. Compounds of esters of strong acids with 4-amino-1.9-anthrapyrimidine.
7. Compounds of esters of sulphuric acid with anthrapyrimidines.
8. Compounds of esters of halogen hydrides with anthrapyrimidines.
9. The compound of toluene sulphonic acid methyl ester with 4-amino-1.9-anthrapyrimidine.
10. The compound of dimethyl sulphate with 4-hydroxy-1.9-anthrapyrimidine.
11. The compound of methyl iodide with 2-brom-4-benzoylamino-1.9-anthrapyrimidine.
12. A process for producing compounds of esters of strong acids with anthrapyrimidines which comprises heating anthrapyrimidines with esters of strong acids substantially in the absence of water.
13. A process for producing compounds of esters of strong acids with anthrapyrimidines which comprises heating anthrapyrimidines with esters of strong acids in the presence of an inert organic diluent substantially in the absence of water.
14. A process for producing compounds of esters of strong acids with anthrapyrimidines which comprises heating anthrapyrimidines with esters of strong acids in the presence of a halogenated hydrocarbon.

KARL KOEBERLE.